Patented May 11, 1948

2,441,305

UNITED STATES PATENT OFFICE 2,441,305

METHOD FOR TREATING POTATOES

Margaret Wilson, Raleigh, N. C.

No Drawing. Application December 27, 1944,
Serial No. 570,488

5 Claims. (Cl. 99—156)

This invention relates to a method of treating and preparing potatoes and similar vegetables for market and for other purposes.

The bright attractive surface which freshly-dug potatoes have, soon changes to a dark, dull appearance which, while it does not affect their quality as a food, detracts from their attractiveness and saleability.

It is an object of my invention to provide a method whereby freshly-dug and washed potatoes and like tubers, may be treated in a rapid and efficient manner to partially soften, decompose, or gelatinize the cells comprising the phellem or outer portion of the periderm layer of the skin.

Another object of my invention is to provide a method for treating the outer surfaces of tubers, particularly potatoes, to produce a natural bright glazed and attractive surface that is durable, long lasting, and one that will enhance their saleability and increase their use as an article of diet.

Another object is to provide a method of treating potatoes, that will reduce the present large losses due to mold and rot.

A still further object is to provide a method of treating potatoes that have lost their lustre because of the aforesaid rapid evaporation of skin moisture, whereby the original bloom and lustre may be restored.

Other objects and advantages will become apparent as the description proceeds.

It has heretofore been proposed to employ a relatively dilute solution of the hypochlorite of an alkali-earth metal, such as sodium, in the treatment of fruits and vegetables. For example, in the patent to Slater, 1,842,696, the use of a 0.1% to 0.5% solution of sodium hypochlorite is mentioned, while in Wilson, 2,348,946, a 2% to 6% solution of the same chemical is mentioned. In each case, the solution is relatively dilute and the time element is, quite obviously, unimportant, since no time of action is mentioned. Furthermore, the sole purpose of the solution in all prior art with which I am familiar, is as a sterilizing agent to kill bacteria, molds and micro-organisms causing decay, and to remove molds.

My invention effects all of the results of the prior art but it goes much further in providing a method that causes an actual change in the cellular structure of the potato skin, whereby the aforementioned results are attained in a new and highly efficient manner.

By extensive investigation and research I have found that the use of a much more concentrated solution of a hypochlorite of an alkali-earth metal, coupled with a predetermined time of application, produces results that are far more effective than could be assumed or predicted merely on the effects of the more dilute and weaker solutions suggested by the prior art. For example, I found that a solution of sodium hypochlorite of not less than 8% concentration, acts to decompose or break down the larger outer cells of the periderm of the skin of the potato. While a solution of this or greater concentration will penetrate rapidly to the edible portions of the potato and render such portions disagreeable to the taste, I have found that by using a relatively concentrated solution, applied for a short time only, and then rapidly washing and drying the tubers, a surface is imparted that retains for a long time the bright, shiny or glazed appearance of newly-dug and washed potatoes.

In carrying my method into practice the freshly-dug potatoes are passed through an atomizing spray of the solution used and which, as aforesaid, may be an 8% solution of sodium hypochlorite. This step may be conveniently carried out while the tubers are being advanced to a scrubber washer. However the solution is applied, it must effectively cover the entire surface of the potatoes and, as the time element is very important, be so applied that all the surface of each potato is substantially instantaneously covered. I have discovered that a period of ten to twelve seconds is the proper time for the solution to act. Therefore, the treating apparatus may be conveniently arranged so that the aforesaid time elapses between the time each potato is covered by the hypochlorite and the time it passes into the washer.

The aforesaid solution of a concentration substantially as identified, when allowed to act for 10 to 12 seconds, decomposes or breaks down the outer layers of cells of the phellem and so softens it that not only may several of the outer layers of cells be removed by the mechanical action of the washer, but also the immediately underlying layers of cells are given a gelatinized condition that makes it possible to form a film or more compact surface that retains the moisture on the inside of the potato and at the same time imparts a bright and glossy appearance.

As the potatoes enter the washer, they pass through strong sprays of water that immediately remove all traces of the solution. Thereafter they are mechanically scrubbed, as by revolving brushes or other mechanical devices, to thereby remove the coarse gelatinized outer layers of the potato skin. In addition, in my opinion, the mechanical working or surface contact between the scrubber washer and the potatoes, acts further to reduce the size of those outer cells that remain after the tubers pass to the drier. Stated in another way, the slightly gelatinized surface of the potatoes, remaining after removal of the outer layers of cells, acts to fill up the pores between the remaining outer layers of cells and thus to form a more or less impervious film that not only imparts an attractive glazed surface to the tubers, but also effectively prevents the evaporation of moisture from the edible portions. This step therefore acts to remove a portion of the skin cells as well as unsightly spots and blemishes, while the short time between application of the solution and its removal, does not permit penetration into the edible portion. I desire to point out that if the solvent is in contact with the potato long enough to be absorbed into the skin to a greater penetration than the outer layer of phellem that can be removed by washing and brushing, the potato will be ruined for purposes of human consumption because the solvent will impart an objectionable taste and odor to the edible portions of the potato and the cell structure of the skin will actually be made more porous because of the excessive number of cell layers removed. A concentrated solvent will be absorbed very quickly and it was for this reason that its use has been deemed impractical, if not impossible, by inventors and investigators in the art. A dilute solvent will be absorbed less quickly, but a dilute solvent even by long contact, has little or no gelatinizing effect on the skin, while the active ingredient of even a very dilute solution, will be absorbed into the potato and impart an objectionable taste and odor thereto, an appreciable time before even the maximum small gelatinizing effect has been produced. That is why the combination of the concentrated solution, coupled with a predetermined time of action, is critical and gives a new and wholly unexpected result.

As soon as the potatoes are washed and all traces of the hypochlorite solution have been removed or washed away, the potatoes are passed to a dryer where they are subjected to blasts of heated air of such temperature and velocity that the surface moisture is evaporated and the potato is thoroughly and quickly dried before the heat has had time to penetrate to the interior or edible portions thereof. While the time of drying is not highly critical and depends somewhat upon the temperature and humidity of the air blasts, I have found that four to five minutes of drying in air at a temperature of 110° to 115° Fahrenheit, gives satisfactory results. As a general rule, it is impractical to attempt to regulate the humidity of the ambient air drawn into the drier. Hence, when the relative humidity of the outside air is low, the drying temperature can be correspondingly reduced while, when said humidity is high, the temperature of the drying air should be raised to effect the desired rapid rate of evaporation.

After the potatoes are thoroughly dried, they emerge with a smooth, fresh, semi-glazed surface that not only renders them very attractive but also improves their resistance to rot and mold. The potatoes retain this bloom or fresh appearance for a long time and the losses because of spoilage are greatly reduced. Too, there is effected a large saving in the labor cost inevitable when potatoes must be sorted by hand to separate the good from the defective ones. As a result, I have provided a method that is simple, relatively inexpensive, highly effective in improving the appearance and "keeping" qualities of potatoes, and one that is quickly carried out because of the necessarily limited time during which the solvent is permitted to act.

While I have described the invention as applied to potatoes, it is obviously useful in connection with vegetables having a skin or outer covering of substantially similar cell structure. Furthermore, while I have mentioned a solution of sodium hypochlorite of about 8% concentration, the hypochlorites of like alkali metals may be used in equivalent concentrations. Also concentrations stronger than 8% may be used by correspondingly reducing the time of contact. In view of the shortness of the time I have mentioned, namely, 10 to 12 seconds with an 8% concentration, it is obviously necessary to use great care in getting the most satisfactory time for greater concentrations up to 12%. In general, the time of contact should vary inversely as the concentration of the solution.

Hence I do not wish to be limited by the precise numerical values identified in the foregoing specification, although they are the values now preferred by me. On the contrary, I wish to embrace in my invention all such modifications and variations as fall within the scope of the subjoined claims.

Having now described my invention, what I claim as new and desire to secure by Letters Patent is:

1. The method of treating tubers, comprising, applying a solution of a hypochlorite of an alkali-earth metal of not less than 8% nor more than 12% concentration, and completely removing said solution from the tubers 10 to 12 seconds after its application.

2. In a method of treating potatoes, the steps comprising, instantaneously covering the potatoes with a solution of sodium hypochlorite of not less than 8% nor more than 12% concentration, for a period of 10 to 12 seconds, instantaneously removing said solution at the end of said period by the application of water, and quickly drying the potatoes in strong blasts of heated air.

3. The method of preparing tubers, to retain a bright semi-glossy appearance and to resist mold and rot, comprising, instantaneously covering said tubers with an atomized spray of a solution of sodium hypochlorite of 8% to 12% concentration, allowing said solution to act for a period of 10 to 12 seconds, thereafter completely removing said solution with strong sprays of water, mechanically removing a number of the outer layers of the periderm softened by said solution, and immediately evaporating all surface moisture of said tubers.

4. The method of treating potatoes comprising, bringing said potatoes into surface contact with a solution of sodium hypochlorite of a concentration of not less than 8% and not greater than 12%, washing said potatoes to quickly and completely remove said solution at the end of a period of 10 to 12 seconds after contact, mechanically scrubbing said potatoes to remove a number of the outer layers of skin cells softened by said solution and to reduce the cell size of the outer of the remaining layers of cells, and quickly drying said potatoes in blasts of air heated sufficiently to evaporate the surface moisture content of said potatoes in not more than four to five minutes.

5. A method of treating potatoes to impart thereto a lasting glossy surface, comprising, applying to said potatoes an 8% to 12% solution of sodium hypochlorite, permitting said solution to act for a period of 10 to 12 seconds to gelatinize the outer layers of skin cells, quickly removing said solution by washing at the end of said period, scrubbing said potatoes to remove a number of the gelatinized layers of skin cells and to glaze the outer layers of the underlying skin cells, and quickly evaporating the surface moisture of said potatoes.

MARGARET WILSON.

REFERENCES CITED

The following references are of record in the file of this patent:

UNITED STATES PATENTS

| Number | Name | Date |
| --- | --- | --- |
| 1,842,696 | Stater | Jan. 26, 1932 |
| 2,241,436 | Williams | May 13, 1941 |
| 2,348,946 | Wilson | May 16, 1944 |
| 2,374,210 | Kalmar | Apr. 24, 1945 |